(12) United States Patent
Grek et al.

(10) Patent No.: US 7,238,915 B2
(45) Date of Patent: Jul. 3, 2007

(54) METHODS AND APPARATUS FOR IRRADIATING A SUBSTRATE TO AVOID SUBSTRATE EDGE DAMAGE

(75) Inventors: Boris Grek, Hayward, CA (US); David A. Markle, Saratoga, CA (US)

(73) Assignee: Ultratech, Inc., San Jose, CA (US)

( * ) Notice: Subject to any disclaimer, the term of this patent is extended or adjusted under 35 U.S.C. 154(b) by 0 days.

(21) Appl. No.: 11/236,271

(22) Filed: Sep. 26, 2005

(65) Prior Publication Data
US 2007/0068908 A1   Mar. 29, 2007

(51) Int. Cl.
*B23K 26/08* (2006.01)
(52) U.S. Cl. .................. 219/121.8; 219/121.66
(58) Field of Classification Search ........... 219/121.65, 219/121.66, 121.8; 438/166, 487, 795
See application file for complete search history.

(56) References Cited

U.S. PATENT DOCUMENTS

| 6,747,245 | B2 * | 6/2004 | Talwar et al. ............ 219/121.8 |
| 2004/0065643 | A1 * | 4/2004 | Tanaka .................... 219/121.8 |
| 2005/0045604 | A1 * | 3/2005 | Talwar et al. .......... 219/121.65 |

FOREIGN PATENT DOCUMENTS

JP    1-173707 A  *  7/1989
JP    11-145073 A *  5/1999

* cited by examiner

*Primary Examiner*—Geoffrey S. Evans
(74) *Attorney, Agent, or Firm*—Allston L. Jones

(57) ABSTRACT

Methods and apparatus (100) for scanning a surface (12) of a substrate (10) with an obliquely incident radiation beam (20) over a select scan path (210) to avoid damage (30) to the curved edge (14) of the substrate. The methods and apparatus allow for the substrate edge to be irradiated with the full intensity of the radiation beam, provided that the edge crossing positions avoid a region where the polar angle is less than a scan path critical (SPC) polar angle ($\phi_C$). At the SPC polar angle the temperatures produced by scanning the beam on the substrate surface and on the edge are the same. The scan path is arranged so the edge crossing positions are located where the polar angle corresponding to each meets or exceeds the SPC polar angle. Ensuring that the substrate edge temperature ($T_E$) remains at or below the substrate surface temperature ($T_S$). The invention has particular utility in laser thermal processing (LTP) of circular silicon substrates when forming transistor-based integrated circuits.

14 Claims, 11 Drawing Sheets

METHODS AND APPARATUS FOR IRRADIATING A SUBSTRATE TO AVOID SUBSTRATE EDGE DAMAGE

CROSS-REFERENCE TO RELATED APPLICATIONS

This patent application is related to U.S. patent application Ser. No. 11/040,739, entitled "Methods and Apparatus for Truncating an Image Formed with Coherent Radiation", (hereinafter, "the '739 patent application"), filed Jan. 21, 2005, and assigned to Ultratech, Inc., San Jose, Calif.

BACKGROUND OF THE INVENTION

1. Field of the Invention

The present invention relates to thermal processing of a substrate, and in particular relates to methods and apparatus for irradiating a substrate in a manner that avoids damaging the substrate.

2. Description of the Prior Art

Laser thermal process (LTP), also known more generally as rapid thermal processing (RTP), is a technique for manufacturing semiconductor devices such as integrated circuits or "ICs". LTP involves irradiating a substrate with a beam of intense radiation to rapidly bring the substrate surface from a relatively low temperature (e.g., 400° C.) to a relatively high temperature (e.g., 1,200° C.) so that the substrate bulk can pull the temperature down quickly.

One prime application of LTP is for dopant activation of the source/drain regions of transistors formed in a silicon Wafer. The source/drain regions are typically formed by exposing areas of a silicon wafer to an electro-statically accelerated ion beam containing boron, phosphorous or arsenic ions. After implantation, the dopant atoms are largely interstitial, do not form part of the silicon crystal lattice, and are electrically inactive. Activation of these dopant atoms is achieved by raising the substrate temperature high enough and for a period of time long enough for the crystal lattice to incorporate the impurity atoms. The optimum length of time depends on the maximum temperature. However, during the activation thermal cycle, the impurities tend to diffuse throughout the lattice causing the distribution to change from one approximating an ideal step profile during implant to a profile having a shallow exponential fall-off.

By employing higher annealing temperatures and shorter annealing times, it is possible to reduce dopant diffusion and retain the abrupt step-shaped dopant distribution achieved after the implant step. The continuous reduction in transistor feature sizes has lead to a process called Laser Spike Annealing (LSA), which employs a $CO_2$ laser beam formed into a long, thin image that is raster scanned across the wafer. In a typical configuration, a 0.1 mm wide beam is scanned at 100 mm/s over the wafer surface to produce a 1 millisecond dwell time for the annealing cycle. A typical maximum temperature during this annealing cycle might be ~1350° C. In the 1 millisecond time it takes to bring the wafer surface up to the annealing temperature, only about 100–200 microns of material nearest the upper surface is heated. Consequently, the bulk of the 800 micron thick wafer serves to cool the irradiated surface almost as quickly as it was heated once the laser beam moves past.

A wafer that has been processed to the point where it is ready for the annealing step typically contains a number of thin film structures such as gates, poly-silicon runners and pads, and oxide isolation trenches. These structures may be superimposed. The distribution of these structures varies from region to region across a circuit, depending on the function of a particular area of the circuit. Typically, the reflectivity of the circuit varies depending on the proportion of the various structures present in a given region. This leads to substantial variations in the proportion of the laser beam energy absorbed in any area and thus uneven heating.

In some cases, even a 5° C. variation in the maximum annealing temperature can lead to observable performance issues for the circuits being annealed. This temperature variation might correspond to less than a 0.5% variation in the absorption coefficient of the product wafer surface. A minimum variation in absorption can be achieved by using P-polarized radiation incident on the substrate at or near the Brewster angle. P-polarized radiation incident on an undoped silicon surface is completely absorbed at the Brewster angle. In the case of a patterned wafer, the Brewster angle refers to the angle of minimum or near-minimum reflectivity of P-polarized light from a surface. Strictly speaking, films on the surface of an object such as silicon wafer, or electrically active dopants in the silicon prevent it from having a true Brewster angle. Accordingly, the Brewster angle as used herein for a specular surface formed from a variety of different films stacked on a substrate (as is the case for a product IC wafer) can be thought of as an effective Brewster angle, or the angle at which the reflectivity of P-polarized radiation is at a minimum. This minimum angle typically coincides with or is near the angle of the true Brewster angle for the (bare) substrate.

A further reduction in reflectivity variation can be achieved by using wavelengths that are large compared to the device structures on the wafer. This condition is met with the 10.6 micron $CO_2$ laser. The Brewster angle for bare silicon at 10.6 microns is about 75° from normal incidence.

FIG. 1 is a schematic side view of a substrate 10 with an upper surface 12 with an associated surface normal N12. Substrate 10 includes an outer edge 14 with an associated edge normal N14. Unlike surface normal N12, whose direction is the same for points on the upper surface, the edge normal N14 varies in direction as a function of the polar angle $\phi$ (see FIG. 4) in the X-Y plane.

Substrate 10 includes a narrow annular exclusion zone 18 of width $W_E$ (FIG. 4) that runs around the upper surface 12 adjacent outer edge 14. Exclusion zone 18 is the region between the substrate edge and the process area 19, which is the portion of the substrate where full yield is expected when producing semiconductor devices such as ICs. Substrate 10 is shown being irradiated with a radiation beam 20 that performs LTP of the substrate by scanning the beam over the upper surface. Radiation beam 20 is incident upon substrate upper surface 12 at a surface incident angle $\theta$ with respect to surface normal N12. Surface incident angle $\theta$ may be, for example the (effective) Brewster angle for the substrate. The intensity $I(\theta)$ of radiation beam 20 at substrate surface 12 is given by $I(\theta)=I_0 \cos(\theta)$, wherein $I_0$ is the baseline radiation intensity measured normal to the radiation beam.

When irradiating the substrate at a high incident angle $\theta$ (e.g., ~75°) with scanned radiation beam 20, substrate edge 14 on the far side FS (relative to the incident direction of the radiation beam) never sees the incident radiation beam, even when the beam moves from position A to position B. However, substrate edge 14 on side NS is prone to exposure by radiation beam 20 when the beam is in position A. Further, radiation beam 20 makes an incident angle $\psi$ with respect to edge normal N14, wherein $\psi=90°-\theta$ when $\phi=0°$.

Thus, if $\theta=75°$, then $\psi=15°$. Accordingly, if radiation beam 20 is in position A, the intensity I at the near side substrate edge 14 is approximately 3.73 times greater than the intensity at surface 12. This can raise the near-side substrate edge temperature to a level sufficient to damage (e.g., form fractures 30) in the substrate at the substrate edge.

At first glance, it might appear that this problem is easily solved by simply blocking the portion of radiation beam 20 that strikes wafer edge 14. However, when radiation beam 20 is coherent, as is typically the case for LTP or other irradiative processes requiring a high-power beam, a baffle that blocks a portion of the radiation beam before it reaches substrate edge 14 on near side NS, also diffracts the radiation beam. The diffracted radiation interferes constructively or destructively with the portion of the beam directly incident on the substrate, depending on the position. This causes some portions of the regions on substrate surface 12 to be overexposed while other regions are underexposed. The variation in exposure caused by diffraction can be as high as 20% or more. Thus, any attempt to block the beam from striking the substrate edge results in an unacceptable non-uniformity at the substrate surface that extends well beyond the narrow exclusion zone 18, making this shielding approach an untenable solution.

Simply turning the radiation beam off and on as it approaches and recedes from the wafer edge is also not particularly effective. This is because the wafer edge exclusion band 18 is typically only 3 mm wide, while radiation beam 20 has a typical width of 6 to 10 mm. Thus, a linear scan of substrate surface 12 near edge 14 results in either some of the edge being directly exposed by the beam, or the beam being turned off before all of the desired area of the substrate surface has been exposed.

The '739 patent application solves the edge exposure problem by utilizing an optical system that includes an anamorphic relay, an apodized aperture, and a vignetting edge moving in synchronism with the scan. However, this is a relatively complex and expensive solution to the problem.

SUMMARY OF THE INVENTION

An aspect of the invention is a method of processing a substrate having a curved outer edge and an upper surface, to avoid damaging the substrate edge with a scanned radiation beam. The method includes determining, relative to the substrate, a scan path critical (SPC) angle ($\phi_C$). The SPC angle corresponds to an edge position where the scanned beam would produce a substrate edge temperature that is substantially the same as a substrate surface temperature when the substrate is irradiated. Edge crossing positions corresponding to a polar angle greater than the SPC angle have temperatures below the substrate surface temperature. The method also includes irradiating the substrate with the radiation beam over a scan path chosen so that any intersection of the radiation beam with the substrate edge meets or exceeds the SPC angle.

Another aspect of the invention is the above-described method, wherein the scan path includes adjacent arcuate segments connected to transition segments, wherein the intersection of the radiation beam with the substrate edge occurs during a transition segment. Also, the transition segments are connected to turn-around segments to complete the scan path.

Another aspect of the invention is an apparatus for thermally processing a surface of a substrate having an upper surface and a curved edge. The apparatus includes a radiation source adapted to emit radiation, and an optical system adapted to receive the emitted radiation and create therefrom a radiation beam that is incident the substrate upper surface at an incident angle to form an image having a sufficient intensity to process the substrate. The apparatus also includes a chuck adapted to support the substrate, a stage adapted to movably support the chuck, and a controller operably coupled to the radiation source and the stage. The controller is programmed to move the stage so that the image moves relative to the substrate surface over a scan path. The scan path is arranged so that any position where the scanned radiation beam intersects (crosses) the substrate edge creates a substrate edge temperature that does not substantially exceed the surface temperature created by the irradiation process.

Figure 1:
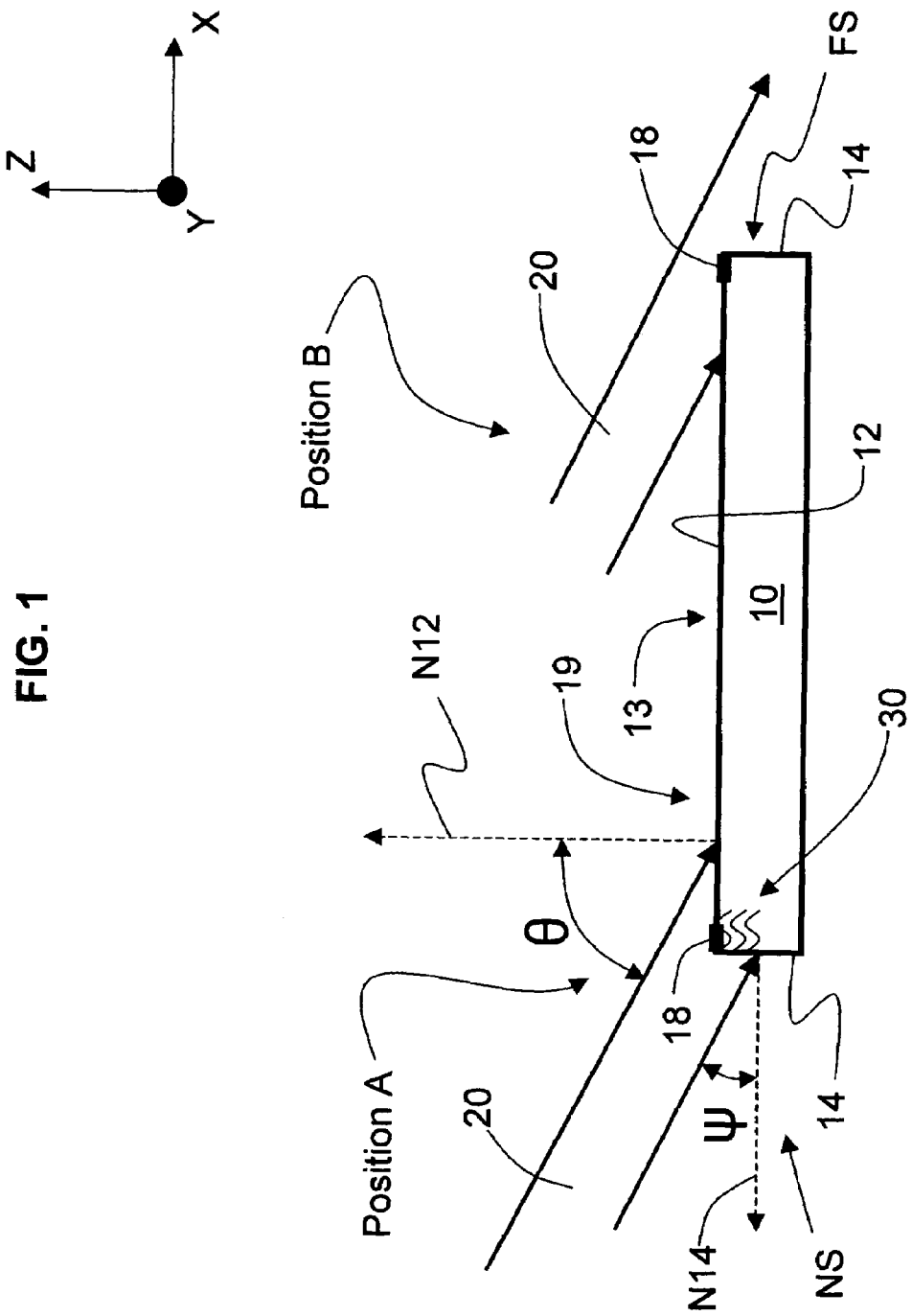
FIG. 1 is a side view of a substrate, such as a semiconductor wafer, being irradiated by a radiation beam at an incident angle relative to the surface normal while performing LTP, illustrating how the radiation beam irradiates and damages the near side substrate edge while in position A due to the intense heating of the substrate edge.

The various elements depicted in the drawings are merely representational and are not necessarily drawn to scale. Certain proportions thereof may be exaggerated, while others may be minimized. The drawings are intended to illustrate various implementations of the invention, which can be understood and appropriately carried out by those of ordinary skill in the art.

DETAILED DESCRIPTION OF THE INVENTION

The present invention includes systems and methods for processing a circular substrate in a manner that avoids damaging the substrate edge. The system of the present invention is described in an example embodiment of an LTP system. Methods of the invention are then described in connection with processing of the substrate using the LTP system by scanning the line image formed by the LTP system over a scan path that satisfies a "safe scan" condition, as described below.

LTP System

Figure 2:
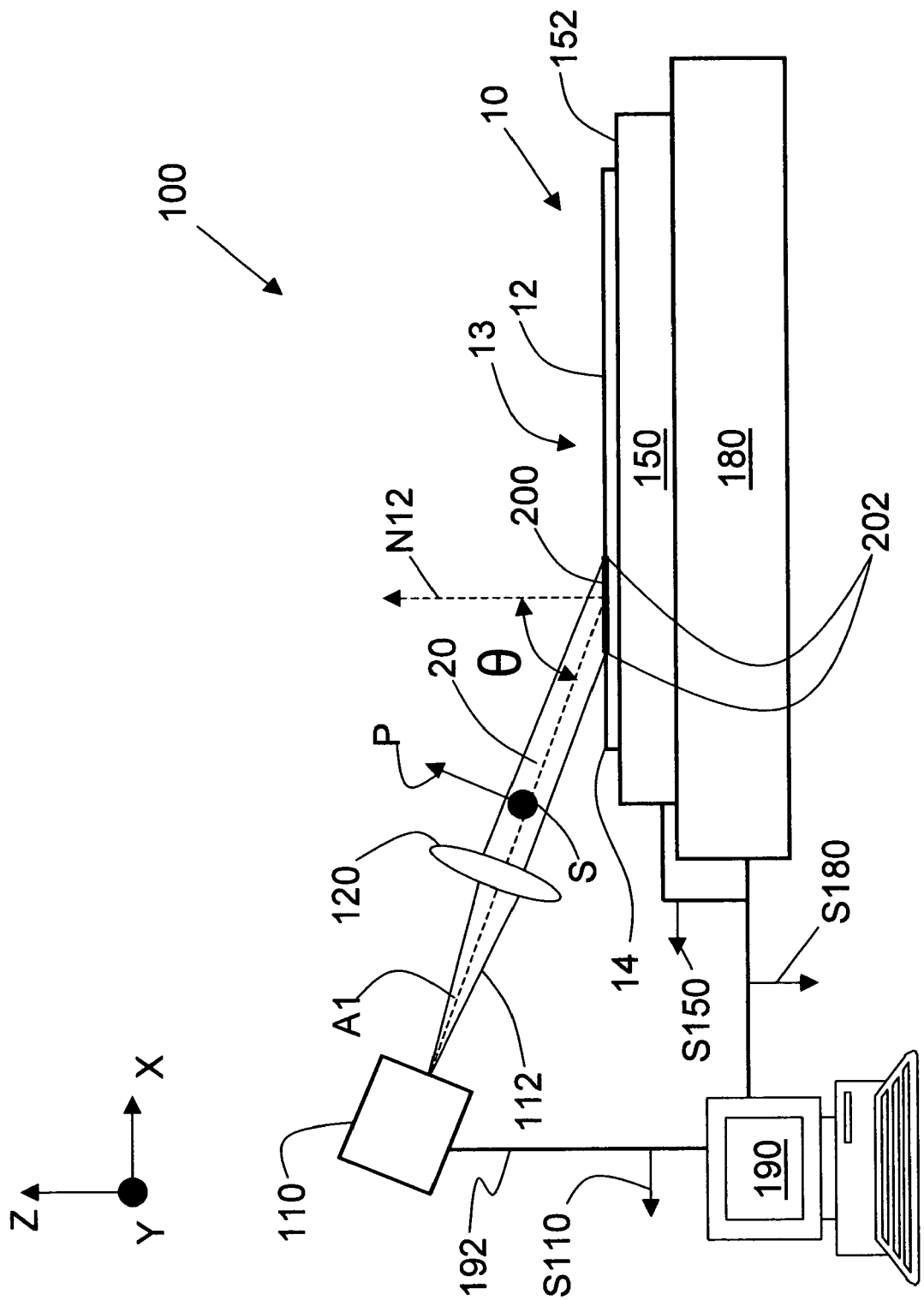
FIG. 2 is a schematic side view of an example embodiment of an LTP system adapted to carry out the methods of the present invention.

FIG. 2 is a schematic diagram of an example embodiment of an LTP system 100. LTP system 100 includes a radiation source 110 that emits radiation 112 along an optical axis A1. An optical system 120 is arranged along optical axis A1 downstream from radiation source 110. Optical system 120 is adapted to receive radiation 112 and form therefrom an LTP radiation beam 20 that travels along optical axis A1. In an example embodiment, radiation source 110 is a laser, such as a $CO_2$ laser. LTP system 100 also includes a substrate chuck unit 150 with an upper surface 152 adapted to support circular substrate 10 with upper surface 12, a center 13 and an edge 14 (FIG. 1). In an example embodiment, substrate 10 is a silicon wafer with doped source and drain regions 182 and 184 (FIG. 3) that need to be thermally activated as part of a process of forming transistor-based IC devices. In an example embodiment, chuck unit 150 is adapted to be heated to 400° C. and is also water cooled so that a constant background substrate temperature can be maintained whether or not the laser beam is contributing large amounts of power (e.g., 3000 W) to the substrate and the chuck. Chuck unit 150 is supported by a movable stage 180.

A controller 190 is operably coupled to radiation source 110 via an electrical line 192. Controller 190 controls the amount of radiation 112 (and thus the power) emitted by radiation source 110 via a control signal S110 provided to the radiation source by the controller. Controller 190 is also operably coupled to stage 180 and controls the movement of the stage via a stage control signal S180. In an example embodiment, controller 190 is also coupled to chuck 150 and is in operable communication therewith via signals S150 to maintain control of the substrate background temperature.

In an example embodiment, controller 190 is a programmable computer having a processor, such as a field-programmable gate array (FPGA), adaptable to carry out logic operations and cause LTP system 100 to carry out the scanning methods described below.

LTP Method of Operation

With continuing reference to FIG. 2, in the operation of LTP system 100, controller 190 generates control signal S110 and sends it to radiation source 110. In response thereto, radiation source 110 generates radiation 112, which is formed into radiation beam 20 by optical system 120. In an example embodiment, radiation beam 20 has a Gaussian profile in the narrow direction and a flat topped intensity profile in the long direction, i.e., the intensity is essentially flat in the center (i.e., at and around the vicinity of optical axis A1 and then drops off sharply at some distance from the optical axis A1. The P- and S-polarization directions are indicated by "P" and "S", respectively.

Radiation beam 20 irradiates substrate surface 12 by forming thereon a long narrow image 200. Axis A1 forms an incident angle θ relative to surface normal N12. In a preferred embodiment, surface incidence angle θ is at or near the Brewster angle for the substrate. For a silicon substrate, the Brewster angle is about 75°. In an example embodiment, image 200 is in the form of a line image having opposite ends 202. Movement of stage 180 via the programmed direction of controller 190 via signals S180 causes substrate surface 12 to be scanned under image 200 along a scan path 210 (introduced and discussed below in connection with FIGS. 4–7). The scan path of image 200 is designed to avoid damaging the substrate edge with powerful radiation beam 20.

Line image 200 has an intensity profile that drops from a relatively constant value of 100% intensity at the ends of the useful length of the line image (e.g., ends 202), down to an intensity value that will not damage the edge in a distance corresponding to the width of edge exclusion zone 18 (FIG. 1). In the specific case of a silicon wafer annealed with 10.6 micron radiation, radiation beam 20 is formed so that intensity of line image 200 falls to about 37% of its maximum intensity in a distance d that is equal to or less than the width $W_E$ of the edge exclusion zone 18.

The portion of substrate surface 12 being irradiated at any given time during the image scanning is rapidly heated to a high temperature (e.g. 1350° C.) and then rapidly cooled to a background temperature (e.g., 400° C.) as the image 200 moves away. The amount of time that image 200 spends over any given point on substrate surface 12 is called the "dwell time", denoted herein as $t_D$, and is typically on the order of milliseconds or less.

Analysis of Substrate Edge Damage from Radiation Beam Scanning

As discussed above, radiation beam 20 is incident upon substrate surface 12 at an incident angle θ. If radiation beam 20 has an intensity $I=I_0$ measured at normal incidence to the radiation beam, then the intensity of radiation beam at a given incident angle θ is given by $I(\theta)=I_0 \cos \theta$. Thus, for an incident angle θ at or near the Brewster angle for silicon of about 75°, the intensity of radiation beam 20 at substrate surface 12 is ~$(0.26)I_0$, or about 74% less than that associated with a normally incident radiation beam. Accordingly, when performing LTP, this reduction in intensity is taken into account and the radiation beam is provided with a sufficiently high baseline intensity $I_0$ so that irradiation of the substrate at an incident angle θ yields an intensity I(θ) sufficient to thermally process the wafer.

Figure 3:
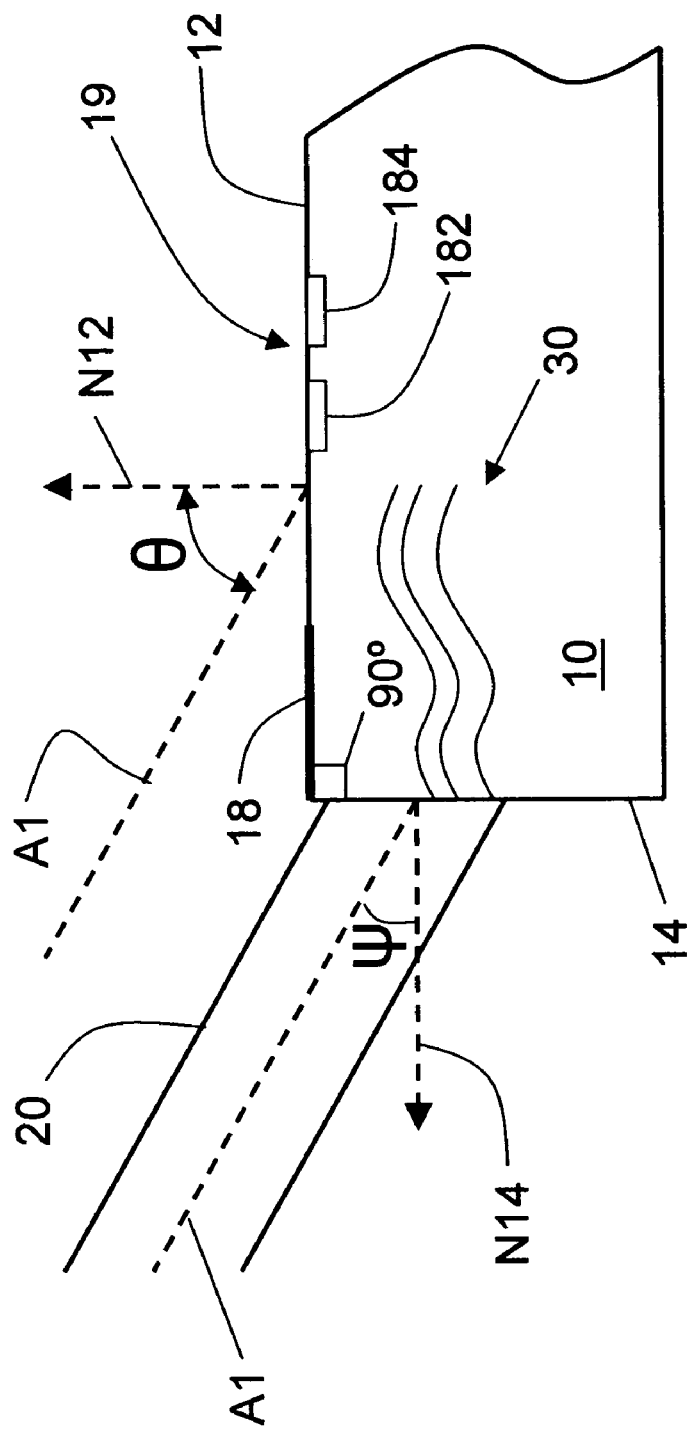
FIG. 3 is a close-up side view of the substrate edge of FIG. 2, illustrating how the radiation beam is incident upon the substrate edge at an edge incident angle $\psi$, and also showing damaged regions created in the substrate edge surface.

FIG. 3 is a close-up side view of substrate 10 illustrating radiation beam 20 incident on substrate edge 14 at an edge incident angle ψ, defined as the angle between axis A1 and the normal N14 to edge 14. Usually the angle ψ is a compound angle with respect to the X-Y-Z coordinate system, however under the special circumstance where φ=0°, then ψ=90°−θ, assuming the angle between surface 12 and edge 14 is a right angle. In the case of a silicon substrate where the Brewster angle is 75°, the incident angle ψ on the edge is 15° for the special case φ=0°. At this incident angle and polar angle, the intensity incident upon substrate edge 14 as compared to the intensity incident the substrate surface is:

$$I(\psi)/I(\theta) = I_0 \cos(15°)/I_0 \cos(75°) = 0.966/0.256 = 3.73 \quad (1)$$

Experiments have shown that this increased intensity level damages the substrate at edge 14. e.g., forms fractures 30. The ratio of the edge temperature to the surface temperature not only depends on the intensity ratio defined in equation (1) but also on the proportion of the incident energy that is absorbed in both cases. Assuming the incident beam is P-polarized and incident at the Brewster's angle then virtually all of the radiation incident on the top surface is absorbed. However, only about 71% of the P-polarized radiation incident on the edge is transmitted into the substrate, since the beam is incident at 15°. Thus the ratio between the absorbed intensity at the edge and at the top surface is about 2.66 for the case $\phi=0$. Clearly this ratio will vary depending on the polar angle $\phi$. Experiments by the inventors have shown that edge damage can be eliminated by keeping the temperature produced by the radiation beam incident upon on the substrate edge at or below the temperature produced by the beam upon the substrate surface.

Scan Path Geometry

Figure 4:
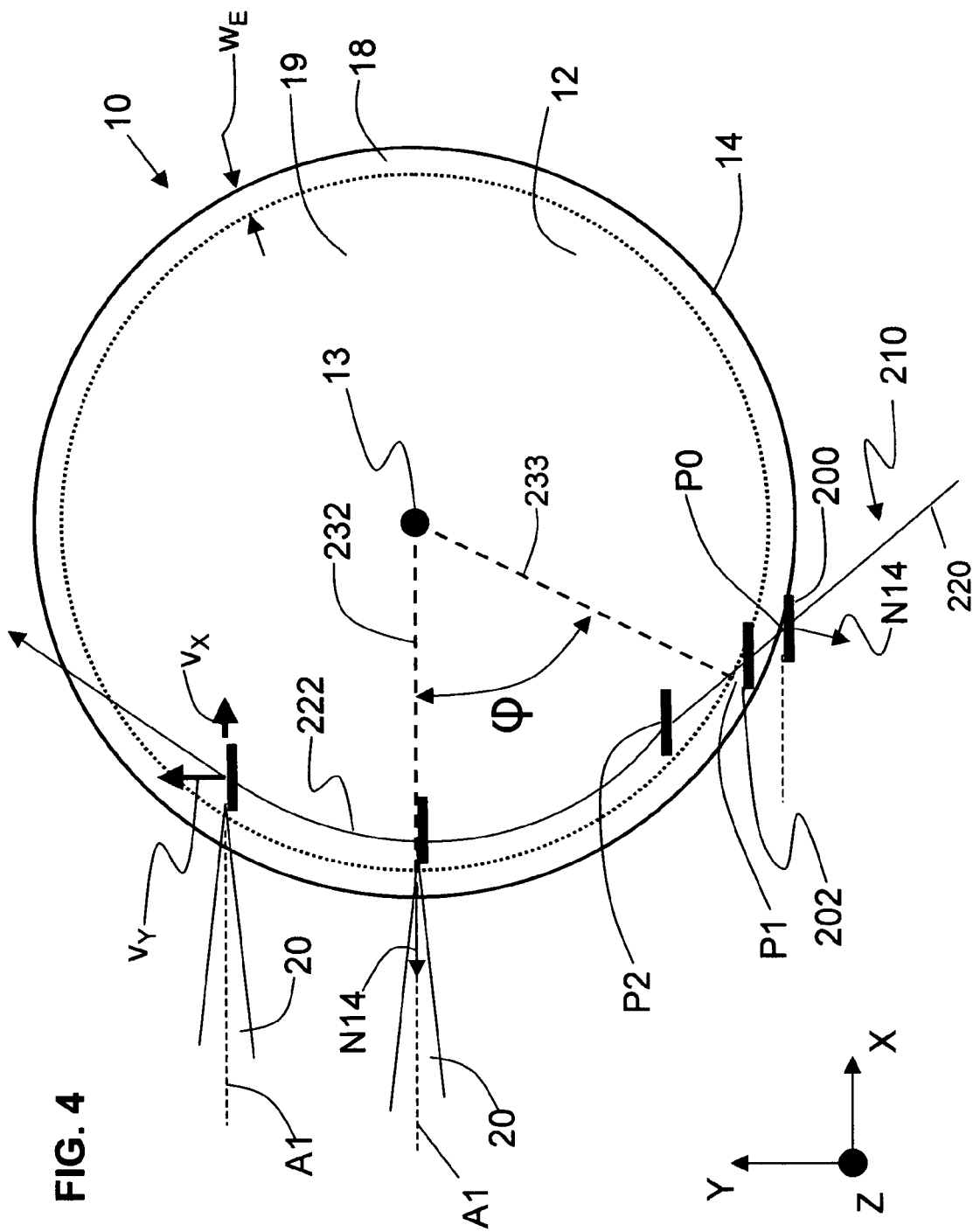
FIG. 4 is a plan view of the substrate surface and the initial section of a scan path for the line image created by the LTP apparatus of FIG. 2, showing the transition points where the line image first crosses the substrate edge (point P0), where the line image is just fully within the substrate edge (point P1), and where the end of the line image begins to follow the exclusion zone boundary (point P2)

FIG. 4 is a plan view of substrate 10 being irradiated by radiation beam 20 over a scan path 210 traversed by image 200. In this view the scan paths starts below P0 off of surface 12 and progresses to the position PO where the edge of the line image just intercepts the substrate edge and then progresses along a linear path to positions P1 and P2. X-Y-Z coordinates are shown in FIG. 4 for reference. Line image 200 formed by radiation beam 20 is first incident upon substrate edge 14 at an initial point P0 via a first scan path transition segment 220, which in an example embodiment is linear. Line image 200 continues along (linear) scan path transition segment 220 and transitions from the edge 14 to completely within the substrate upper surface at a first transition point P1. Transition point P1 defines a polar angle $\phi$, that is measured relative to reference line 232, which is parallel to axis A1 projected on the X-Y plane, and passes through center 13 of substrate 10, and a line 233 connecting center 13 to line image edge 202 at point P1. When image end 202 transitions across the exclusion zone and first falls entirely within process area 19 at a second transition point P2, then scan path 210 starts to follow a new (e.g., arcuate) scan path segment 222 that is collinear with or tangential to the linear scan path segment 220 at point P2. Thus, the point P2 is where the scan path transitions from the edge exclusion zone 18 into the process area 19 of substrate surface 12 and where the path changes to an arcuate path having a radius equal to the exclusion edge boundary.

To prevent edge damage during irradiation of the substrate, it is necessary that the polar angle $\phi$ associated with the transition of line image 200 over substrate edge 14 be greater than or equal to a critical angle $\phi_c$, which is defined as the angle where the edge temperature and the top surface temperature due to irradiating the substrate with line image 200 are equal.

In an example embodiment, transition scan path segment 220 that connects to the arcuate scan path segment 222 is linear up to point P2 at which scan path 210 transitions into an arcuate scan path (scan path segment 222) that has a radius equal to the radius of the inner edge of exclusion zone 18. The transition scan path segment 220 and the arcuate scan path segment 222 are colinear at the transition point P2.

Also, in this example embodiment, it is assumed that the laser power is held constant over the entire scan path 210 and that the Y-direction component of the scan velocity is constant. This yields a fixed dwell time and a constant maximum annealing temperature. Under these conditions the point where edge damage is most likely to occur along the scan path is at point P1, which corresponds to scan path angle $\phi$.

The analysis set forth below, is an example of how the critical scan path angle $\phi_c$ might be calculated for a substrate 10 of silicon, and for a wavelength of radiation beam 20 of 10.6 microns. This calculation yields a SPC angle $\phi_c=57°$. If scan path 210 is arranged at the edge crossing position so that the scan path angle $\phi$ is equal to or larger than the SPC angle $\phi_c$ of 57°, then the temperature of substrate edge 14 will be maintained at a temperature equal to or less than the temperature of substrate upper surface 12. This, in turn, will greatly reduce the chances of radiation beam 20 causing substrate edge damage 30. Other substrate materials have different indices of refraction, and therefore a different Brewster's angle and a different SPC angle $\phi_c$.

Edge Temperature Analysis

To estimate the maximum temperature produced on substrate edge 14 relative to that produced on substrate surface 12, it is necessary to estimate the proportion of energy absorbed per unit image length in the direction of the line image on the edge versus that on the surface.

The incident angle $\psi$ of radiation beam 20 with respect to substrate edge normal N14 (FIG. 3) varies with polar angle $\phi$ and may be calculated by calculating an angle $\beta$ defined as the apparent angle between the radiation beam and the upper surface viewed in the direction of the edge normal:

$$\beta = \text{Arctan}(1/\text{Tan } \theta \text{ Sin } \phi) \quad (2)$$

Having computed the intermediate angle $\beta$, then the compound angle $\psi$ between the edge normal and the radiation beam is given by:

$$\psi = \text{Arctan}(\text{Tan } \phi/\text{Cos } \beta) \quad (3)$$

Figure 5:
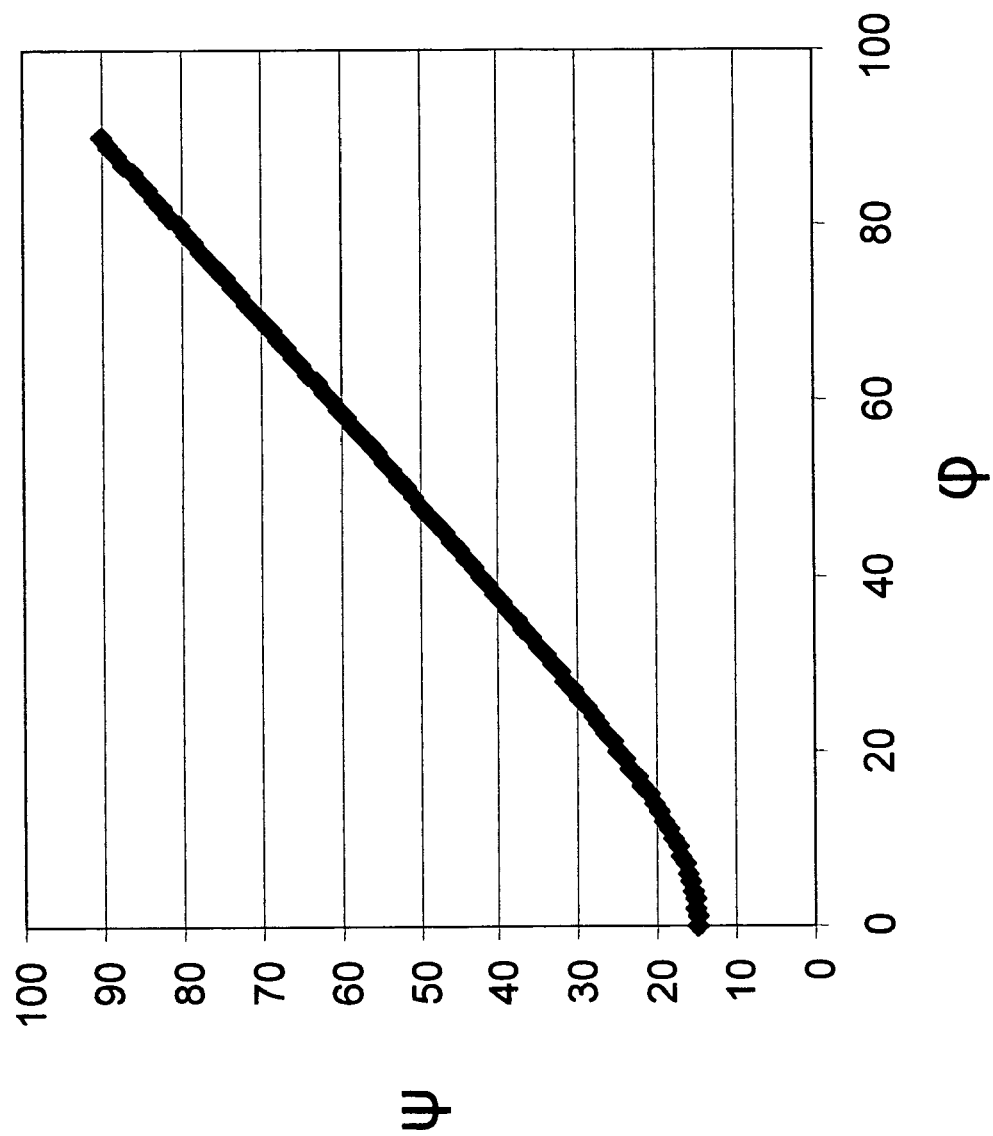
FIG. 5 is a plot of the radiation beam incident angle $\psi$ on the wafer edge as a function of the polar $\phi$.

Equation (3) is plotted in FIG. 5, with surface incident angle $\theta$ assumed to be a constant at 75°, which is approximately the Brewster angle for a silicon substrate. Note that in the plot of FIG. 5, as the polar angle $\phi$ approaches 90°, the compound angle $\psi$ between the edge normal and the radiation beam approaches the value of polar angle $\phi$.

Radiation beam 20 will typically have S and P polarization components (FIG. 2), which are a function of the polar angle $\phi$. Accordingly, it is necessary to compute the relative amplitude of the electric field in the planes corresponding to the P and S polarization planes for radiation beam 20 as a function of polar angle $\phi$. Next the absorption coefficients corresponding to the S and P directions for the angle of incidence corresponding to a specific edge location are computed. Finally, the relative radiation beam powers and the absorption coefficients in the P and S planes are combined to yield the absorbed power.

Figure 6:
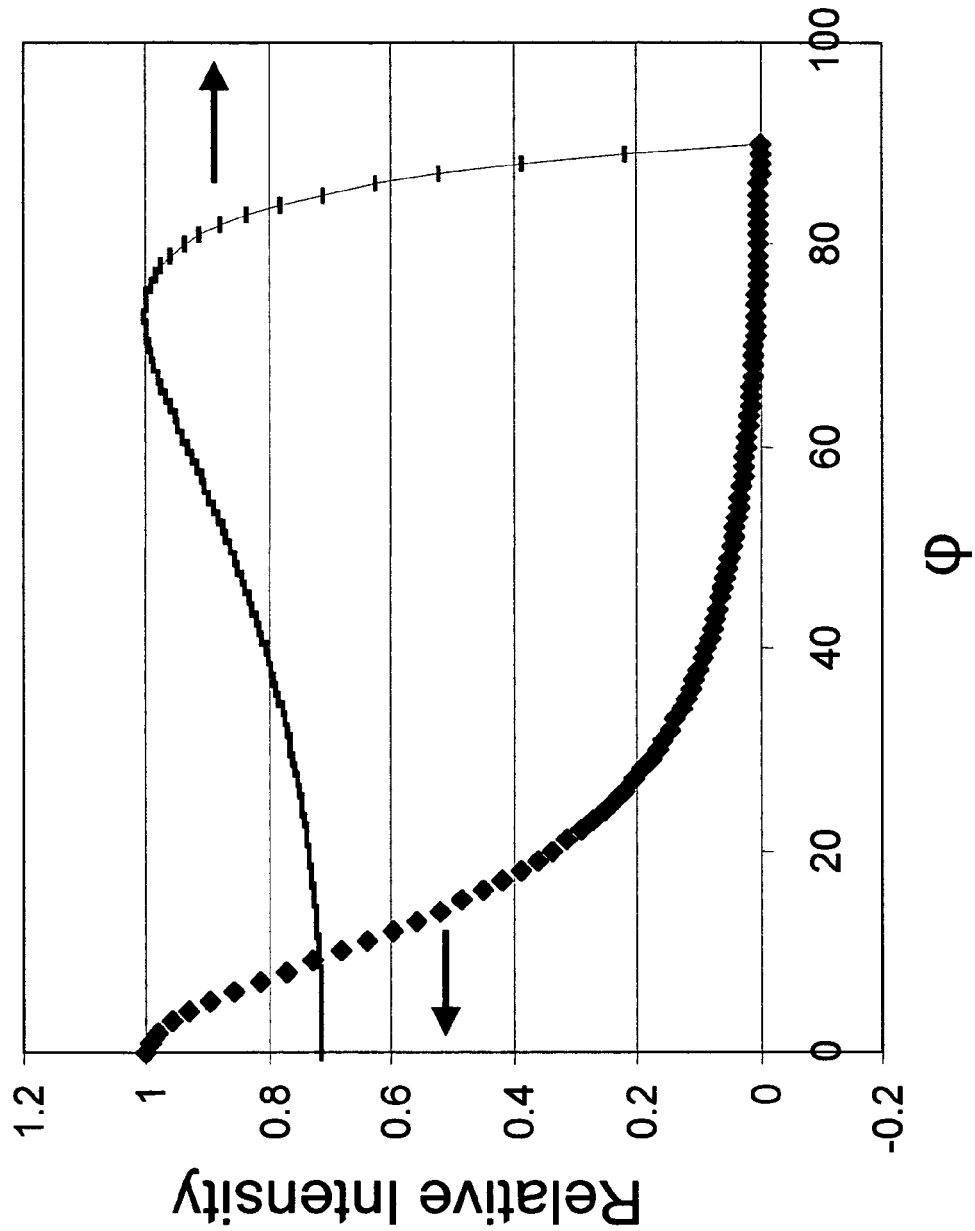
FIG. 6 is a plot showing both the relative intensity of the P-polarization component on the wafer edge and the absorption coefficient of the P-polarization component as a function of the polar angle $\phi$.
Figure 7:
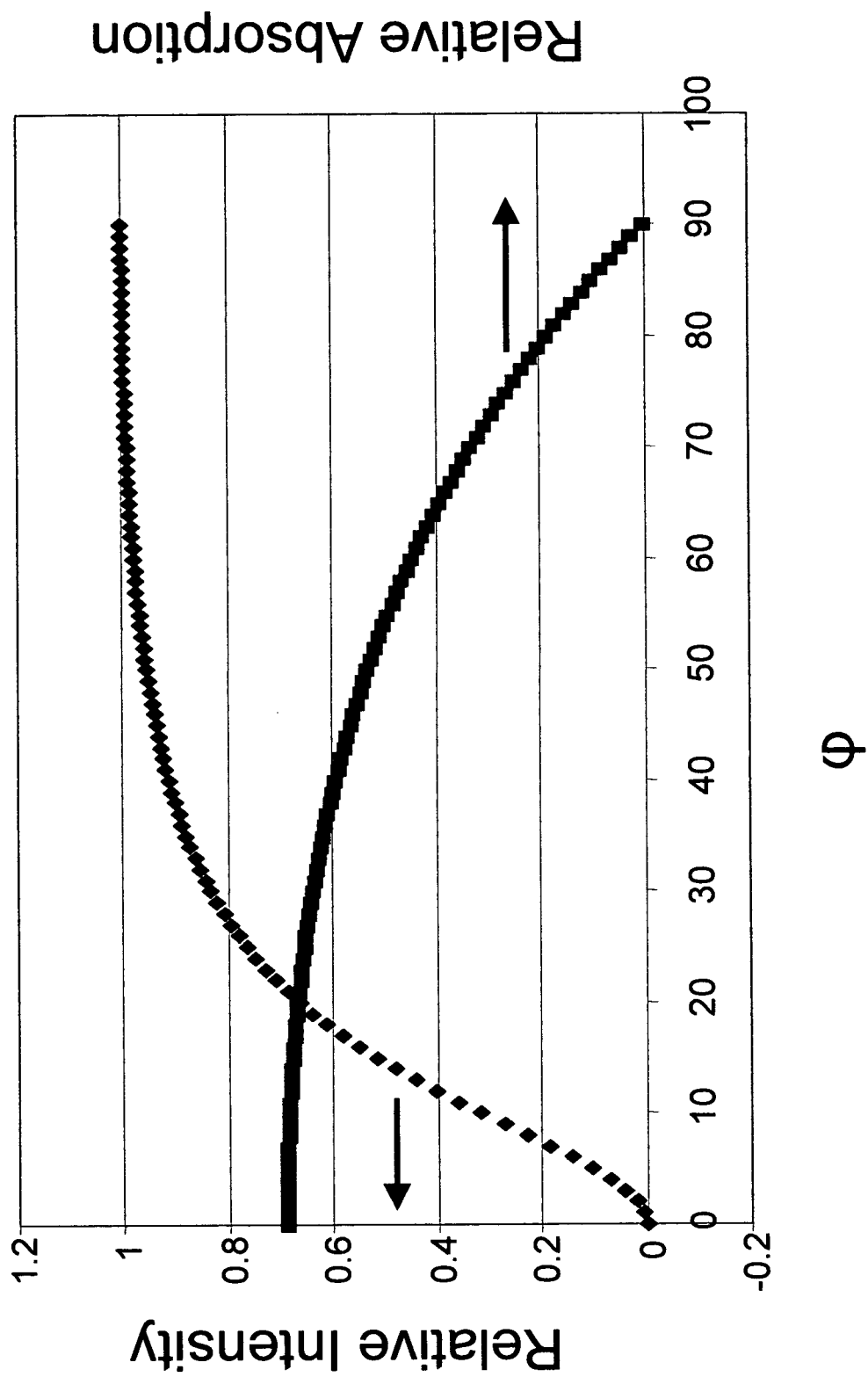
FIG. 7 is a plot showing both the relative intensity of the S-polarization component on the wafer edge and the absorption coefficient of the S-polarization component as a function of the polar angle $\phi$.

FIGS. 6 and 7 are plots of the relative P and S power levels, respectively, and the corresponding absorption coefficients for the P and S polarization directions, respectively, as a function of polar angle $\phi$ for radiation beam 20, according to equations (4) and (5) below.

Assuming the radiation beam incident on the upper surface is P-polarized, then the amplitude of the electric field vector in the P-plane, i.e. the plane containing the beam direction vector and the normal to the wafer edge corresponding to polar angle φ is given by:

$$E_p = \cos\theta \cos\phi / \sin\psi \quad (4)$$

Similarly the amplitude of the electric vector in the S-plane, i.e. the plane containing the beam direction vector and which is normal to the P-plane, $E_s$ is given by:

$$E_s = (1 - E_p^2)^{1/2} \quad (5)$$

The relative intensity corresponds to the square of the amplitude of the electric vector, thus the relative intensity $I_p$ and the relative intensity $I_s$ are given by:

$$I_p = E_p^2 \quad (6)$$

$$I_s = E_s^2 \quad (7)$$

The absorption coefficients of the P- and S polarization components are best defined by reference to an angle $\psi_1$ defined as:

$$\psi_1 = \text{Arcsin}((\sin\psi)/n) \quad (8)$$

Where n is the index of refraction at the wavelength employed in the radiation beam. In the case of undoped silicon radiated at a wavelength of 10.6 microns the index of refraction is about 3.421.

The absorption/transmission coefficients for the p and s polarized components, $A_p$ and $A_s$ respectively, are given by:

$$A_p = 1 - (\tan(\psi 0 - \psi_0)/\tan(\psi + \psi_0))^2 \quad (9)$$

$$A_s = 1 - (\sin(\psi - \psi_0)/\sin(\psi + \psi_0))^2 \quad (10)$$

Figure 8:
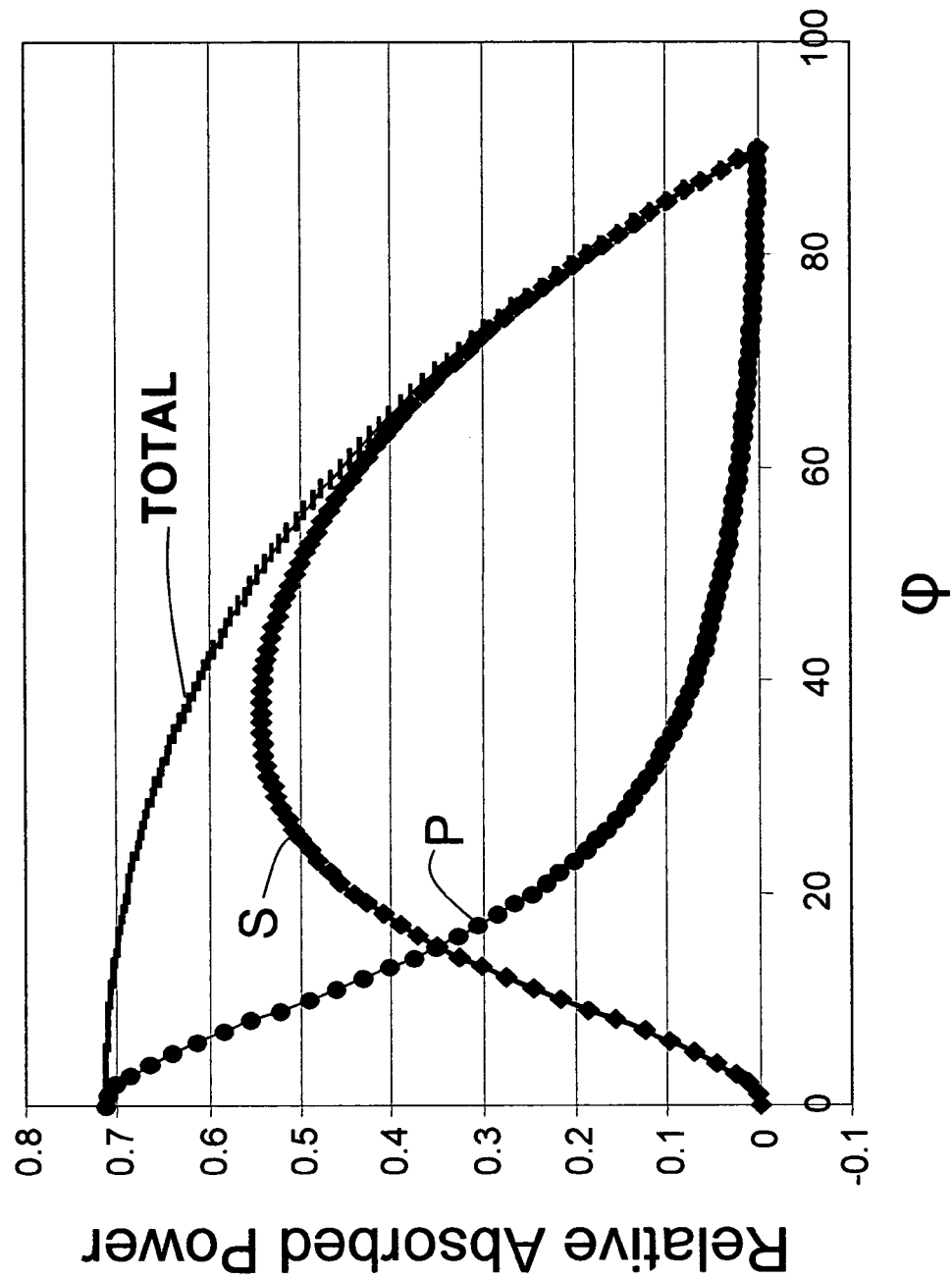
FIG. 8 is a plot of the fractional absorbed intensity of both the S- and P-polarization components of the radiation beam incident upon the substrate edge, together with the total absorbed intensity, all as a function of the polar angle $\phi$.

FIG. 8 is a plot of the relative amounts of absorbed intensities ($P_p$, $P_s$) for the two polarization directions, and the combined total $P_T$, all as a function of polar angle φ. These plots were made by multiplying the relative $I_p$ and $I_s$ intensities (equations 6 and 7) by their respective absorption coefficients $A_p$ and $A_s$ (equations 9 and 10) and then adding the relative absorbed intensities $P_p$ and $P_s$ together to get a total.

$$P_p = I_p A_p \quad (11)$$

$$P_s = I_s A_s \quad (12)$$

$$P_T = P_p + P_s \quad (13)$$

As is evident from the plot in FIG. 8, the energy absorbed in the P-polarization component drops off rapidly as the polar angle φ increases however the energy absorbed in the S-polarization component compensates for that, so the total absorbed power declines slowly as a function of φ as φ approaches 90°.

The maximum temperature produced on the edge or on the surface is simply proportional to the product of the incident intensity, the dwell time and the absorption coefficient. Image 200 is wider on substrate edge 14 than on the surface by a factor of 1/Cos(φ). Also, the scanning speed relative to substrate edge 14 increases by a similar amount. Thus, the dwell time of image 200 is exactly the same for substrate edge 14 as it is for substrate surface 12. Thus to calculate the temperature ratio between the edge and the surface, we only need to multiply the ratio of their respective intensities times the ratio of their absorption coefficients $P_T$. Since the incident intensity is proportional to the cosine of the incidence angle, the ratio of the edge temperature to the surface temperature $T_R$ is given by:

$$T_R = P_T \cos(\psi)/\cos(\theta) \quad (14)$$

Figure 9:
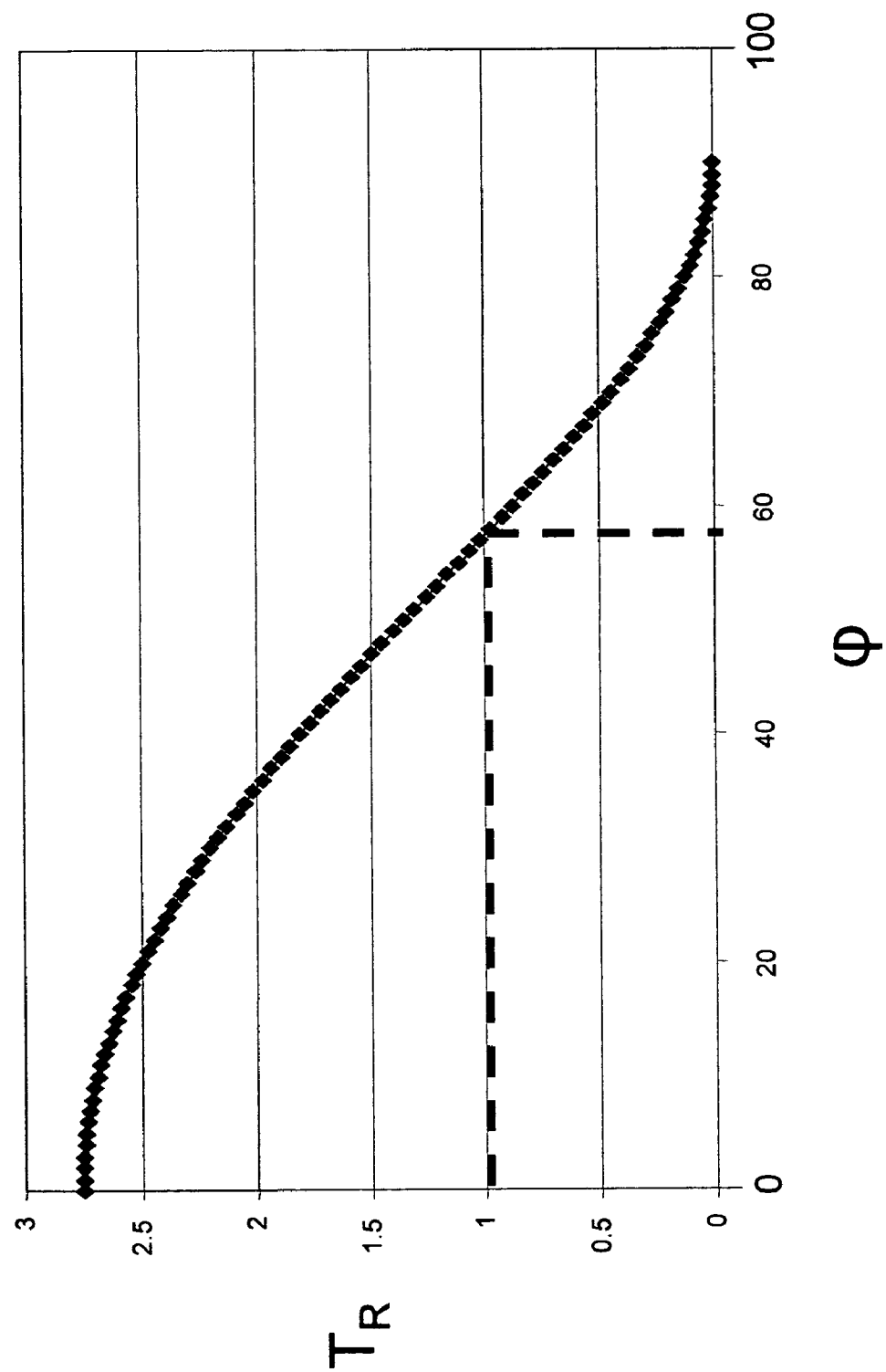
FIG. 9 is a plot of the relative temperature $T_R$ (the ratio of the substrate edge temperature $T_E$ as compared to the substrate surface temperature $T_S$) due to irradiation of the substrate by the radiation beam, as a function of the polar angle $\phi$, showing the SPC angle $\phi_C$ where $T_R=1$.

FIG. 9 is a plot of the relative temperature $T_R$ as a function of the polar angle φ as given by equation 14. Note that from the plot of FIG. 9 as shown by the dashed lines therein, the temperature of substrate edge 14 matches that of substrate upper surface 12 at $\phi_c = 57°$ where $T_R$ equals 1. This angle applies to an undoped silicon wafer radiated at a wavelength of 10.6 microns. Other substrate materials and other laser wavelengths would result in a different value for $\phi_C$. If the polar angle φ associated with the scan path meets or exceeds the SPC angle $\phi_C$, then $T_R$ will be 1 or less, and the risk of damaging the substrate edge is minimized.

Example Scan Path

This invention avoids substrate edge breakage by selecting the scan path 210 of image 200 so radiation beam 20 is never incident on substrate edge 14 in a manner that produces a temperature greater than the temperature produced on substrate upper surface 12. This is accomplished by making sure scan path 210 intersects the substrate edge 14 at points corresponding to a polar angle that meets or exceeds the SPC angle $\phi_C$.

Figure 10:
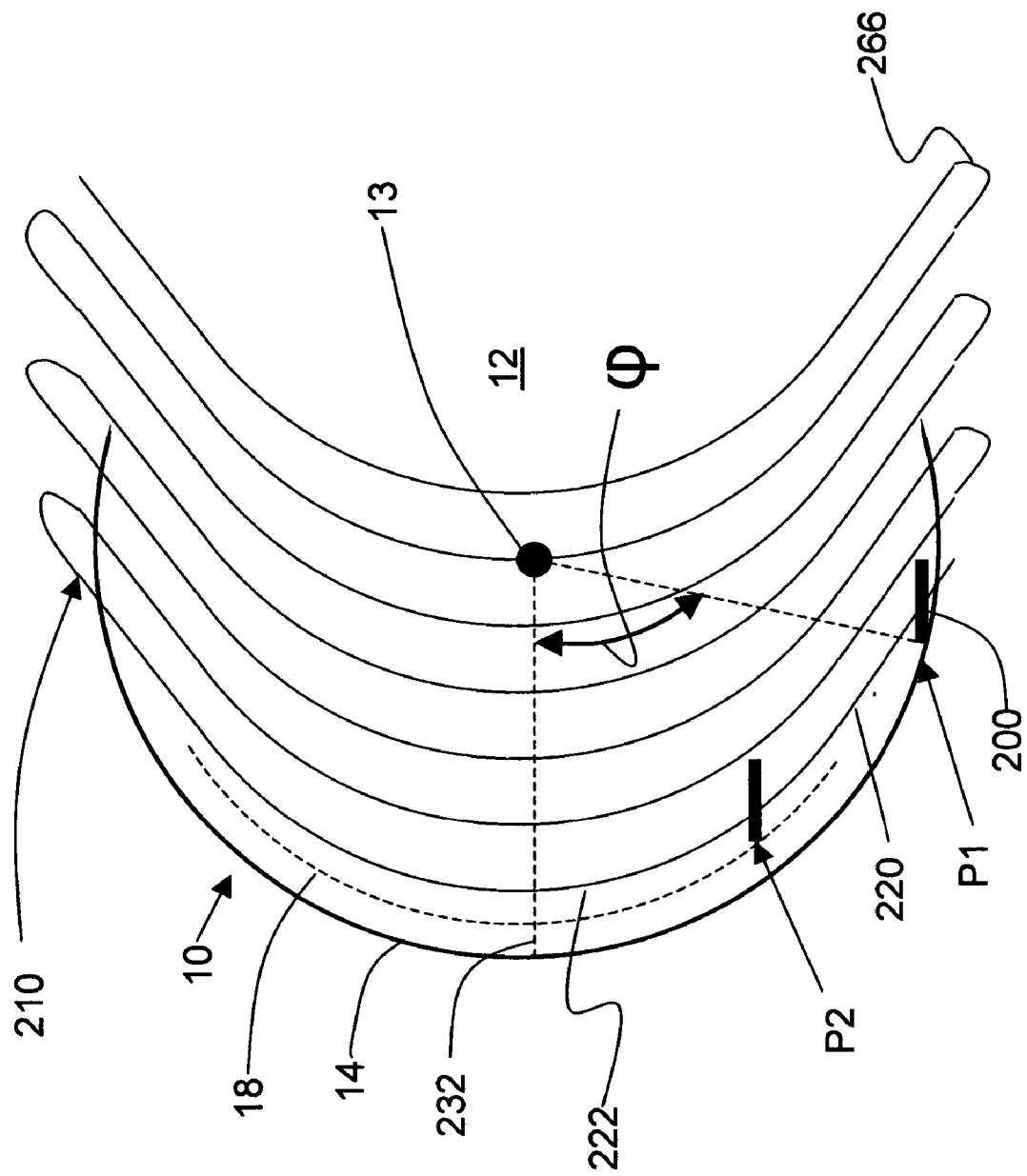
FIG. 10 is a plan view of the substrate illustrating an example embodiment of a scan path for a line image being scanned over the substrate surface, wherein the scan path includes a plurality of arcuate scan path segments coupled by respective transition segments that bring the line image off of and onto the substrate surface at polar angles that equal or exceed the SPC angle $\phi_C$ so that the substrate edge temperature remains substantially at or below the substrate surface temperature.

FIG. 10 is a plan view of substrate 10 surface 12 showing a first example embodiment of multiple scan paths 210 that all satisfy the safe scan condition. Example scan path 210 includes initial linear scan path segment 220 that brings line image 200 initially into contact with substrate 10 at point P0 (FIG. 4), and then completely onto substrate 10 at point P1, which should correspond to an angle φ that is equal to or larger than the SPC angle $\phi_C$. Once image 200 falls completely within substrate edge exclusion boundary 18 at transition point P2, the linear scan path segment 220 transitions to the first of a number of arcuate scan path segments 222 that follow the curvature of the inner substrate exclusion zone boundary 18. Adjacent arcuate scan path segments 222 have a similar shape that are laterally displaced by the length of line image 200. In this example embodiment, arcuate segments 222 each have a radius equal to the substrate radius minus the exclusion zone width $W_E$.

Figure 11:
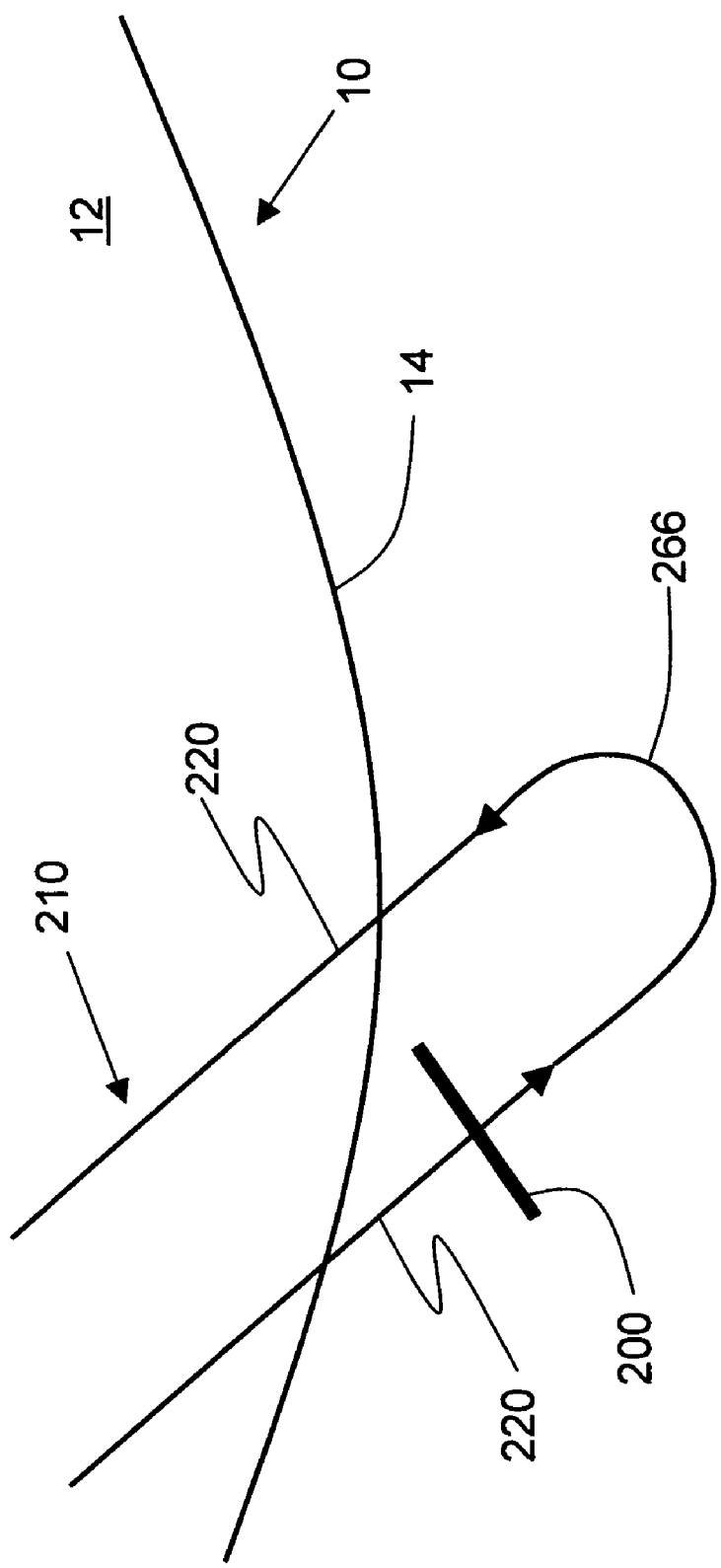
FIG. 11 is a close-up view of the scan path of FIG. 10, showing two transition scan path segments connected to a turn-around scan path segment near the edge of the substrate.

Arcuate scan path segments 222 are connected to transition scan path segments 210 where the image travels off of and back onto the substrate. Adjacent transition scan path segments 210 are connected via turn-around segments 266. FIG. 11 is a close-up view of a portion of scan path 210 near the substrate edge 14 illustrating two transition segments connected by a turn-around segment 266. Turn-around segments 266 are located away from the substrate edge and off of surface 12 so image 200 does not fall on the substrate surface during the transition between adjacent scan segments when the scanning velocity changes substantially. The turn-around segments 266 have to be long enough so the stage velocity can be reversed and brought up to the required speed before the line image again touches the substrate edge.

In an example embodiment, controller 190 is programmed to move stage 180 via control signals S180 to cause substrate 10 to follow scan path 210, such as the example scan path 210 illustrated in FIG. 10. The result is that the entire substrate surface 12 is thermally processed with radiation beam 20 with the exception of the portion of wafer lying between the edge and the inner exclusion boundary and between the polar angle extremes of ±φ. This procedure requires, among other things, coordinated motion in the X and Y scanning axis of stage 180 to produce an arcuate scan path. The positions where transition path segments 220 cross substrate edge 14 are chosen so that the corresponding minimum polar angle at which radiation beam 20 strikes substrate edge 14 satisfies the safe scan condition and no damage occurs to the substrate edge.

In the foregoing Detailed Description, various features are grouped together in various example embodiments for ease of understanding. The many features and advantages of the present invention are apparent from the detailed specification, and, thus, it is intended by the appended claims to cover all such features and advantages of the described apparatus that follow the true spirit and scope of the invention. Furthermore, since numerous modifications and changes will readily occur to those of skill in the art, it is not desired to limit the invention to the exact construction and operation described herein. Accordingly, other embodiments are within the scope of the appended claims.

What is claimed is:

1. A method of processing a substrate having a curved outer edge and an upper surface, so as to avoid damaging the substrate edge with a radiation beam scanned over the substrate surface, the method comprising the steps of:
   a. determining, relative to the substrate an edge position corresponding to a scan path critical (SPC) polar angle ($\phi_C$) where the scanned beam would produce substantially equal substrate edge and substrate surface temperatures when the substrate is irradiated; and
   b. irradiating the substrate by moving the radiation beam over a scan path chosen so that any intersection of the radiation beam with the substrate edge corresponds to a polar angle that meets or exceeds the SPC polar angle.

2. The method of claim 1, wherein the scan path includes: adjacent arcuate segments;
   transition segments connected to the adjacent arcuate segments, wherein some intersections of the radiation beam path with the substrate edge occur along a transition segment; and
   turn-around segments that occur off of the substrate and that connect adjacent transition path segments and the turn-around segments.

3. The method of claim 2, wherein the transition segments are linear.

4. The method of claim 1, wherein the radiation beam forms a line image that is scanned over the substrate surface with a first velocity component normal to a long direction of the line image, and including maintaining the first velocity component constant as the line image is scanned over the entire substrate surface.

5. The method of claim 1, further including the steps of:
   c. forming from the radiation beam a line image that is scanned over a scan path with a first velocity component normal to a long direction of the line image and a second velocity component parallel to the long direction of the line image; and
   d. varying the second velocity components so as to create a scan path having joined, arcuate scan path segments and linear scan path segments.

6. The method of claim 1, wherein the radiation beam forms a line image having a length in a long direction of the line image, and including forming adjacent scan path segments spaced apart in the long direction of the line image by an amount equal to or less than the line image length.

7. The method of claim 1, wherein the substrate is circular and has a radius and an exclusion zone width, and including forming the scan path to include arcuate segments each having a radius equal to the substrate radius minus the exclusion zone width.

8. The method of claim 1, further including the steps of:
   c. forming from the radiation beam an image at the substrate surface; and
   d. moving the substrate relative to the image so as to cause the image to follow the scan path.

9. A method of thermally processing a substrate having a curved outer edge and a upper surface to activate doped regions formed adjacent the upper surface, comprising the steps of:
   a. determining, relative to the substrate, a scan path critical (SPC) angle ($\phi_C$) that corresponds to an edge position where the scanned beam would produce a substrate edge temperature that is substantially the same as a substrate surface temperature; and
   b. processing the substrate surface by scanning an image formed by a radiation beam over a scan path, the image made incident upon the substrate surface at an incident angle, and having sufficient intensity to activate the doped regions of the substrate;
   wherein the scan path is chosen so that any intersection of the radiation beam with the substrate edge meets or exceeds the SPC angle.

10. The method of claim 9, wherein the scan path includes:
    adjacent arcuate segments;
    transition segments that connect with arcuate segments, wherein some intersections of the scan path with the substrate edge occur over a transition segment; and
    turn-around segments that connect respective adjacent transition segments and/or respective adjacent arcuate segments, wherein the turn-around path segments occur off of the substrate.

11. A method of processing a substrate having a center, an upper surface and a curved edge, with a radiation beam, the method comprising the steps of:
    a. defining an annular substrate exclusion zone of a select width $W_E$ that extends from the edge toward the center to an exclusion zone boundary;
    b. forming from the radiation beam an image having an intensity that drops off over a distance d equal to or less than the exclusion zone width $W_E$ from a relatively constant value suitable for processing the substrate surface to a value that will not damage the substrate edge;
    c. establishing a scan path for the image that places an edge of the image on the exclusion zone boundary over part of the scan path; and
    d. processing the substrate by scanning the image over a scan path chosen so that any intersection of the radiation beam with the substrate edge does not create a substrate edge temperature that is higher than a maximum substrate surface temperature that occurs during said processing;
    wherein the scan path includes a plurality of arcuate segments and a plurality of transition scan paths that connect adjacent ones of some of the plurality of arcuate segments, wherein at least some of the transition scan paths cross the substrate edge.

12. The method of claim 11, further includes the step of:
    e. shaping the radiation beam so that the image intensity falls to 37% or less of its maximum value over the distance $W_E$.

13. An apparatus for thermally processing an upper surface of a substrate having a curved edge comprising:
    a radiation source adapted to emit radiation;
    an optical system adapted to receive the emitted radiation and create therefrom a radiation beam that is incident the substrate upper surface at an incident angle to form an image having a sufficient intensity to process the substrate when scanned over the substrate;

a chuck adapted to support the substrate;

a stage adapted to movably support the chuck; and a controller operably coupled to the radiation source and the stage, the controller being programmed to move the stage to cause the image to scan over the substrate surface at a velocity v in a scan direction and over a scan path arranged so that any position where the scanned radiation beam intersects the edge creates a substrate edge temperature that does not substantially exceed a maximum temperature produced on the upper surface during said scanning;

wherein the scan path includes a plurality of arcuate segments and a plurality of transition scan paths that connect adjacent ones of some of the plurality of arcuate segments, wherein at least some of the transition scan paths cross the substrate edge.

14. The apparatus of claim 13, wherein the radiation beam incident angle is at or near a Brewster angle for the upper surface of the substrate.

* * * * *